(12) United States Patent
Ledet

(10) Patent No.: US 11,494,056 B1
(45) Date of Patent: Nov. 8, 2022

(54) DYNAMIC DOCUMENT UPDATING APPLICATION INTERFACE AND CORRESPONDING CONTROL FUNCTIONS

(71) Applicant: Open Invention Network LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 17/214,891

(22) Filed: Mar. 28, 2021

Related U.S. Application Data

(63) Continuation of application No. 14/472,728, filed on Aug. 29, 2014.

(51) Int. Cl.
*G06F 3/0482* (2013.01)
*G06F 3/0488* (2022.01)
*G06F 3/04842* (2022.01)

(52) U.S. Cl.
CPC .......... *G06F 3/0482* (2013.01); *G06F 3/0488* (2013.01); *G06F 3/04842* (2013.01)

(58) Field of Classification Search
CPC .... G06F 3/0482; G06F 3/017; G06F 3/04842; G06F 17/30312; G06F 3/0488; G06F 3/167
See application file for complete search history.

(56) References Cited

U.S. PATENT DOCUMENTS

| | | | |
|---|---|---|---|
| 5,606,674 A | 2/1997 | Root | |
| 5,664,133 A | 9/1997 | Malamud et al. | |
| 2006/0253540 A1 | 11/2006 | Hughes | |
| 2009/0044140 A1* | 2/2009 | Chen | G06F 9/543 715/770 |
| 2009/0292987 A1* | 11/2009 | Sorenson | G06F 40/166 715/255 |
| 2010/0088641 A1 | 4/2010 | Choi | |
| 2010/0241954 A1* | 9/2010 | Stuple | G06F 40/166 715/256 |
| 2010/0257447 A1 | 10/2010 | Kim et al. | |
| 2013/0019175 A1* | 1/2013 | Kotler | G06F 3/04886 715/728 |
| 2013/0019205 A1 | 1/2013 | Gil et al. | |
| 2013/0019208 A1 | 1/2013 | Kotler et al. | |
| 2013/0086471 A1* | 4/2013 | Moore | G06F 40/106 715/269 |

(Continued)

OTHER PUBLICATIONS

Anonymous, An Improved method for copying & pasting data between documents, Mar. 12, 2003, IP.com, IPCOM000011413D.

*Primary Examiner* — Sang H Kim

(57) ABSTRACT

A user interface configuration may permit a user to make selections while the interface is dynamically adjusting and reconfiguring its layout and appearance for optimized user satisfaction. One example method of operation may include receiving an input command on a first menu displayed on a touch receptive surface of a user device and modifying a current view of the first menu by moving a menu item either upward or downward among a number of different menu options. The method may also include selecting the menu item responsive to the received input command and also receiving an additional input command to select a functionality to apply to the menu item, and applying the functionality to the menu item.

20 Claims, 10 Drawing Sheets

(56) References Cited

U.S. PATENT DOCUMENTS

| | | |
|---|---|---|
| 2013/0232494 A1 | 9/2013 | Dolph et al. |
| 2013/0339889 A1 | 12/2013 | Bastide et al. |
| 2013/0346491 A1 | 12/2013 | Margolin |
| 2014/0258905 A1 | 9/2014 | Lee et al. |
| 2015/0046800 A1* | 2/2015 | Isidore .................. G06F 40/166 715/255 |
| 2015/0378600 A1 | 12/2015 | Sloan et al. |
| 2016/0139764 A1* | 5/2016 | Huang ................. G06F 3/04842 715/764 |

\* cited by examiner

200

| Gesture | State of the Application | Associated Action |
|---|---|---|
| Two pointing devices making a circular motion (either clockwise direction or counter-clockwise direction) | Context Menu not displayed | Display the context menu |
| Two pointing devices making a circular motion in the clockwise direction | Context Menu displayed | Traverse the menu items downward. If possible, add menu items to the top of the context menu. |
| Two pointing devices making a circular motion in the counter-clockwise direction | Context Menu displayed | Traverse the menu items upward. When a menu item arrives at the top of the context menu, remove that menu item and store it in the application. |
| Two pointing devices sequentially moving toward the center of the context menu making a "pinching" motion. | Context Menu displayed | If the top-most menu item on the context menu is a menu item with a sub-menu, remove the context menu and display the sub-menu |
| Two pointing devices sequentially moving in an outward motion from the center of the context menu. | Context Menu displayed | If the current context menu is a sub-menu, remove the current context menu and display the next, higher context menu. |

FIG. 2

DYNAMIC DOCUMENT UPDATING APPLICATION INTERFACE AND CORRESPONDING CONTROL FUNCTIONS

CROSS-REFERENCE TO RELATED APPLICATIONS

This application is a continuation of U.S. patent application Ser. No. 14/472,728, filed on Aug. 29, 2014, the entire disclosure of which is incorporated by reference herein.

TECHNICAL FIELD OF THE APPLICATION

This application relates to a user interface application that includes a user input portion that can be manipulated to modify a present context of the menu and more specifically to provide dynamic adjustments based on user input and preferences.

BACKGROUND OF THE APPLICATION

Conventionally, document manipulation can include the creation of data, the adding and/or importing of data, deletion of data, and any other manipulation of data performed while operating within an application. The dynamic aspect of the data manipulation includes any text, table, image, video, etc., entered or removed from the document automatically when an action is performed. For example, moving content from and/or into an item on a display or similar functionalities may constitute document manipulation.

In another example, dragging an image from a webpage and dropping the same image into a word processing document, may cause that image to adhere to menu characteristics and/or match the aspects of other existing images in the document, for example, size, clarity, font characteristics, etc.

Many popular applications involve complex menu systems. These applications are normally utilized on a desktop or laptop computer with the display size permitting a full menu. The menu of these applications normally span across the entire width of the application area. As the functionality of the application grows, so does the availability of the menu icons permitting easy access to the different functions. Furthermore, the menus are complex in nature offering many different options for use by the application's user.

One of the many applications that involve potentially complex menu systems is a word processing application. In these applications, the menus are grouped together permitting the functionality offered by the menu selections to be located easily. Other applications have turned to tab components that offer a different set of menus for each tab. This permits the application to re-use the real estate as the menu items are redrawn for each selected tab. The evolution of computer technologies has permitted more functionality available on smaller devices. As users have migrated to smaller devices, they desire more functionality from the applications executing on the same devices.

The hardware of the smaller devices is not at issue as these devices are quite powerful enough to permit similar functionality as their larger counterparts. The issue is the smaller display, or display 'real estate', with which the application executing on the smaller devices has to operate. On large displays, such as desktop or laptop computers, applications make use of the large display area by utilizing the top area of the application to display the menu items. Many applications utilize small pictures, or icons, that make it easier for the user to become familiar with each menu item. In addition, many of the menu items are grouped together into tabs, permitting the user to click a particular tab to gain access to a specific group of menu items. Because of the available real estate, many of the menus also permit drop-down items that show further sub-menu items related to a given menu item. All of those types of menus and sub-menus are losing popularity as the size of computing device displays continues to reduce in size.

SUMMARY OF THE APPLICATION

Application developers utilize various tools that permit the creation and functional programming of contextual menus. Regardless of the programming language being utilized, users of current computer applications have become familiar with those menu functionalities and depend on them to ease their workflow. Due to the vast complex nature of the computer applications, a well-written menu system is the basis for the application's success, and may permit the user to optimize use of the application.

One example method of operation may include a method that provides receiving at least one input command on a first menu displayed on a touch receptive surface of a user device, modifying a current view of the first menu by moving at least one menu item at least one of upward and downward among a plurality of different menu options, selecting the at least one menu item responsive to the received at least one input command, receiving at least one additional input command to select a functionality to apply to the selected at least one menu item, and applying the functionality to the selected at least one menu item.

Another example embodiment may include an apparatus with a receiver configured to receive at least one input command on a first menu displayed on a touch receptive surface of a user device, and a processor configured to modify a current view of the first menu by moving at least one menu item at least one of upward and downward among a plurality of different menu options, and select the at least one menu item responsive to the received at least one input command. The receiver is further configured to receive at least one additional input command to select a functionality to apply to the selected at least one menu item, and the processor is further configured to apply the functionality to the selected at least one menu item.

Another example embodiment may include a method that provides receiving at least one input command on a first menu displayed on a touch receptive surface of a user device, selecting at least one menu item responsive to the received at least one input command, receiving at least one additional input command that is different from the first input command type, identifying the at least one additional input command as a multiple item gesture command, and storing the multiple item gesture command in memory.

Another example embodiment may include an apparatus that includes a receiver configured to receive at least one input command on a first menu displayed on a touch receptive surface of a user device, and a processor configured to select at least one menu item responsive to the received at least one input command, and the receiver is further configured to receive at least one additional input command that is different from the first input command type, and wherein the processor is further configured to identify the at least one additional input command as a multiple item gesture command, and store the multiple item gesture command in memory.

BRIEF DESCRIPTION OF THE DRAWINGS

FIG. 2 illustrates a table describing the operation of the gestures and related operations for traversing a context menu according to example embodiments.

DETAILED DESCRIPTION OF THE APPLICATION

Figure 1:
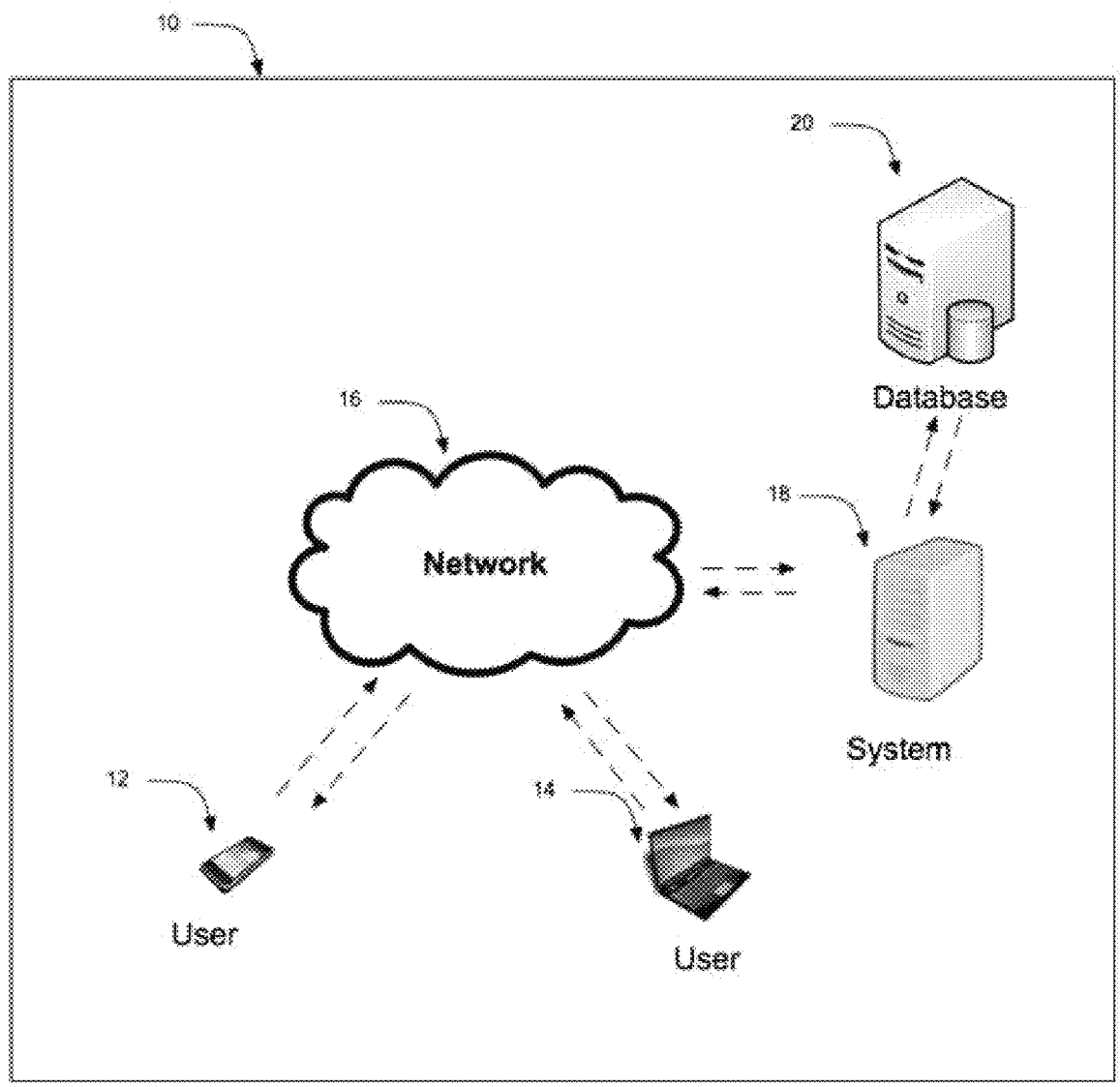
FIG. 1 illustrates a system diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a graphical user interface may include options for traversing through sub-menus, gesturing to traverse a sub-menu, gesturing for traversing out of a sub-menu, parallel functions, choosing multiple menu items, setting the state in the application, selecting data in an application, inputting data into the application. Further, a dynamic menu system is provided that permits an application's menu to be displayed on a smaller display, for example a mobile device, or any other likewise device that is of a smaller nature.

The dynamic nature of the menu system permits for the menu to automatically set the characteristics of incoming data, for example the data's font, font size, table size, size of images, etc. The incoming data automatically adheres to the current characteristics of the document and/or the current characteristics of the current selections of the menu application. The application permits a menu that is intuitive in nature, which permits the user to interact with menus in a similar fashion to the menus used with similar applications on larger displays.

FIG. 1 illustrates a system diagram according to an example embodiment of the present application. In one example embodiment, the network diagram permits a user utilizing a mobile client machine 12 or a more traditional computer 14 to access the current application, which may be in the form of software, and which can be downloaded from the system server 18 and/or which may be currently operating on the client's device 12/14.

The network 10 may include fewer or greater components or different components, such as wired or wireless electronic devices including clients, servers, phones, tablets and computers as well as various networks such as the Internet, intranets and public and private networks, without departing from the scope of the present application. The client device 12/14 can be any of a mobile laptop device and/or a personal desktop computer or a mobile device. The computing device 12/14 is connected to the network 16. It should be noted that other types of devices, in addition to devices 12/14, might be used with the present application. For example, a PDA, a tablet computer, a laptop, an MP3 player, a gaming device (such as a hand held system or home based system) and the like (including a P.C. or other wired device) that can also transmit and receive information could be used with the present application.

The user of the application will interface with the client device 12/14 and connect through the network 16 to the system server 18, which may be redundant or may be more than a single entity without deviating from the scope of the application. A database computer or computing device 20 is directly connected to the system server 18 or connected remotely through the network 16 without deviating from the scope of the application.

The application resides completely or partially on the user's device 12/14 which can be a mobile device, but can also reside on a user's desktop computer, a personal digital assistant (PDA), tablet computer, or any other device containing a processor, memory, and an operating system. In addition, the application can reside on either completely or partially on any one of the other elements in the system depicted in FIG. 1 including the system server 18, the database 20, and/or the network 16. A database 20 may be directly connected to the system server 18, and can be a part of or co-located with the system server 18 or connected remotely through the network 16 without deviating from the scope of the application.

If the application resides on a mobile device 12, the application can be downloaded through a platform, such as an application store or market residing on the device or accessed via the device. In operation, the user may interact with the application executing on the user device 12/14 via a pointing device, a computer keyboard or any other commonly used input devices. The current application can work with any device such as a personal computer with a touch screen, a laptop with a touch screen, a personal computing tablet, a smartphone or any device with a processor, memory and a touch screen.

The current application permits for dynamic document updating. More specifically, the application provides the dynamic ability to obtain data from a first application, and apply the data as input to a second application. Selecting data from an application traditionally required using a pointing device to "highlight" the desired data from the application and act on the selected data accordingly. This process is well understood in computing environments and is utilized in applications regularly across the marketable computing environment.

The current application permits the user to select data desired without having to rely on the previously utilized method of selecting the data. Websites, for example, are normally configured in various elements used to represent the data, the current application permits the user to specify the elements of the data that are desired, as well as access the data minus any elements that may be incorporated internal to the data, thus permitting for the selection of the precise data desired without having to "select" the data from less intuitive operations, such as "highlighting".

In addition to the selection of the data, examples described below permit for dynamic functionality when inserting the selected data into a second application. The dynamic aspect of this functionality is described in two different approaches including the ability to configure through the selection of menu items of a context menu how the incoming data is to be formatted, and the functionality to automatically configure the incoming data to similar data previously existing in the application. Furthermore, the application also provides accessibility functionality for navigating a context menu for use on a device. The device, which could have a restricted display area (i.e., a mobile device, tablet, or any other device that is smaller in nature than a desktop or laptop computer monitor) would be easier to control by utilizing such a configuration.

Embodiments below depict functionality surrounding the accessibility functionality interworking with context menus and menu items included in the context menu. In this example embodiment, further gesture functionality is discussed that permits for the traversing of multiple levels, tiers or sections of a context menus without the user ever having to remove the pointing device(s) from the touchscreen.

In one example, the user may utilize two or more pointing devices to traverse through the context menu. Functionality incorporated in the application permits for the traversing of the context menu by utilizing two pointing devices. The two devices may be separate stylus pen devices, two or more user fingers, a combination of any of the above and a user initiated gesture, a voice command, and a user initiated motion detected, etc.

This implementation permits for a wide range of menu items, which are further grouped by functional similarity. For example, all the layout menu items can be in a submenu denoted "Layout" in a main context menu. Furthering this example, all of the table menu items can be placed under the "Table" option in the main context menu, etc., the submenus can continue until all of the menu items necessary for a full functional menu system are incorporated in the context menu. This design permits a full functional menu presented in a manner that is easily navigated by the user on a touchscreen that may be limited by the amount of display device real estate.

The application containing the context menu can reside on the user's device 12/14, on a device communicably coupled to the user's device 12/14 via the Internet, the network 16, the system server 18, and/or the database 20. As an example, the table in FIG. 2 depicts a possible description of gestures and corresponding actions. Referring to FIG. 2, the table 200 describes the operation of the gestures and related operations for traversing a context menu according to example embodiments. The gesture 220 may be any of a variety of different inputs, for example, two input points performing any of a variety of movements. The corresponding state 230 of the application may be the state of the application or menu that corresponds to that input state. The associated action 240 is the action that ensues as a result of the input 220 and the present state 230.

Examples of gestures may include two pointing devices making a circular motion either in a clockwise direction or in a counter-clockwise direction which may cause the menu to not be displayed at first and then to display the context menu. Another example may include two pointing devices making a circular motion in the clockwise direction, the context menu displayed traverses the menu items downward, and if possible, menu items may be added to the top of the context menu. Another example may include two pointing devices making a circular motion in the counter-clockwise direction which causes a context menu to be displayed and to traverse the menu items upward. When a menu item arrives at the top of the context menu, that menu item may be removed and stored in the application.

Another input may include two pointing devices sequentially moving toward the center of the context menu making a "pinching" motion. In this example the context menu is displayed if the top-most menu item on the context menu is a menu item with a sub-menu, and as a result, the context menu may be removed and the sub-menu may be displayed. In another example, there may be two pointing devices sequentially moving in an outward motion from the center of the context menu. The result would be a context menu displayed. If the current context menu is a sub-menu, the current context menu may be removed and displayed in a higher context menu.

The possible gestures and their associated functions provide that with two pointing devices, for example, two fingers on a user's hand, one could traverse multiple levels of a hierarchy of context menus and context sub-menus without raising the pointing device(s) from the touchscreen. This is important as functionality below depends on the ability for the user to traverse the context menu system with one hand. In another embodiment, the user is able to traverse the context menu by voice, the device's keyboard, iris movements, or any other commonly used methods to direct the flow of control of the executing application on the device.

Figure 3:
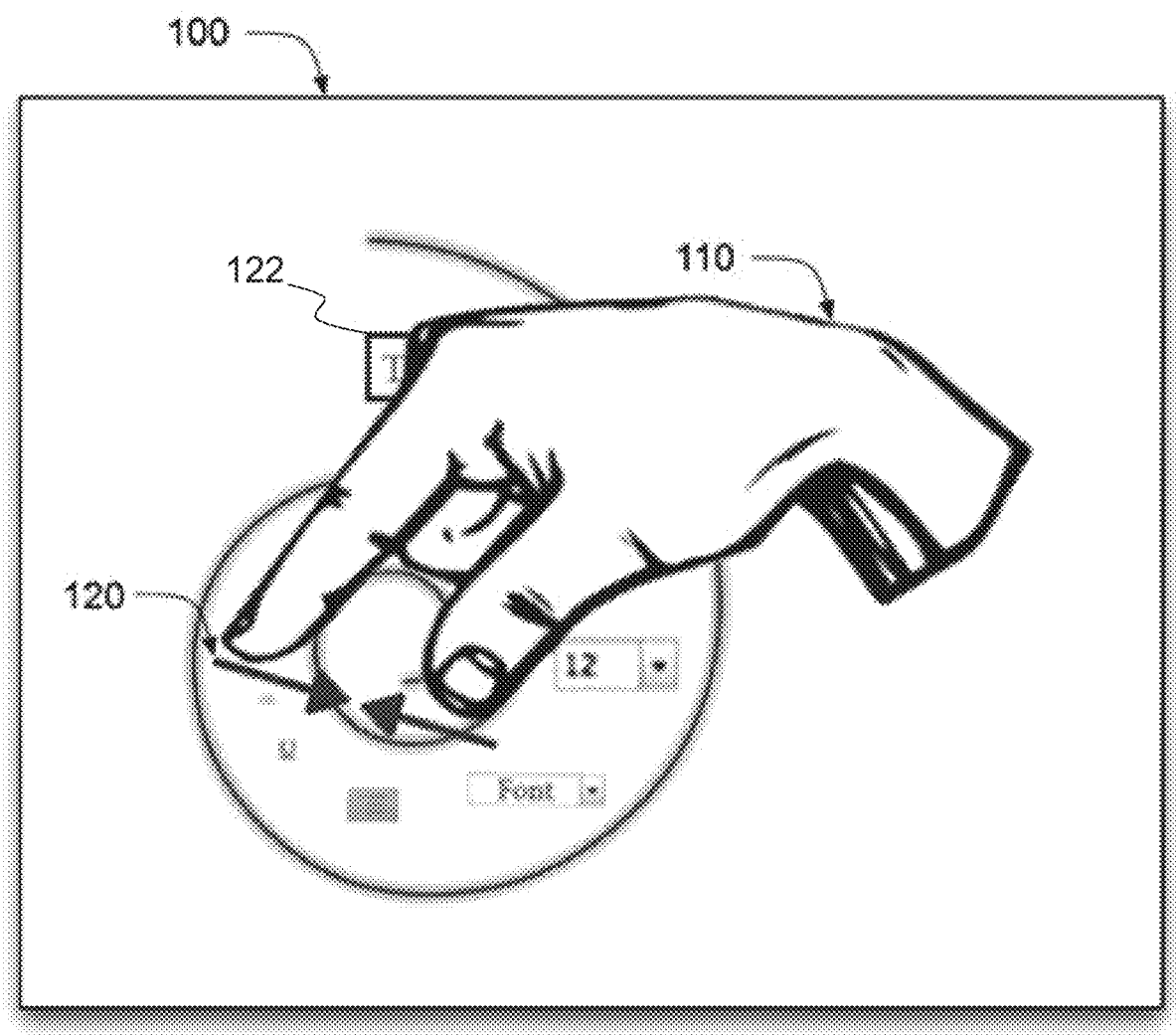
FIG. 3 illustrates a user action gesture being performed on a context menu to display a sub-context menu according to example embodiments.

FIG. 3 illustrates a user action gesture being performed on a context menu to display a sub-context menu according to example embodiments. Referring to FIG. 3, a graphic is shown 100 depicting a context menu under a user's hand 110. In this example, the user has two pointing devices or two input points being utilized at the same time (i.e., two fingers on the user's hand) on the display 120. These two pointing devices are moved together in a pinching motion as a gesture to display a sub-context menu. In this scenario, the "Table" menu item 122 is then displayed as the top menu item on the context menu. The resulting behavior is the current context menu is removed and replaced by a sub-context menu or the context menu associated with the table group. The pinching gesture attempts to display a sub-context menu associated with the menu item in the top-most location of the context menu. If the pinching gesture is provided and the top-most menu item is not associated with a sub-context menu, then no action will occur. When the term 'action' is described throughout the various embodiments, the term may be used interchangeably with input commands and selection operations any of which may be equated to a particular action.

In another embodiment, when a user input traverses into a sub-menu, the previous menu is not removed from the display, but is "faded" in color such that the previous menu appears to be behind the current context menu but in a lighter color making it appear dim in appearance but not removed. As the user traversed through multiple sub-menus in the context menu, the previous menus appear "behind" the current menu, but in a faded or shaded color to indicate the current user selection versus a previous user selection. The previous menus also may be "stacked" such that the first menu appears to the left, followed by the next menu in the hierarchy appears slightly to the right and so on such that all of the menus appear on the device, yet the current context menu may appear on the top of the menus. With this implementation, the user is able to determine where the current context menu is located within the hierarchy of the context menus.

Figure 4:
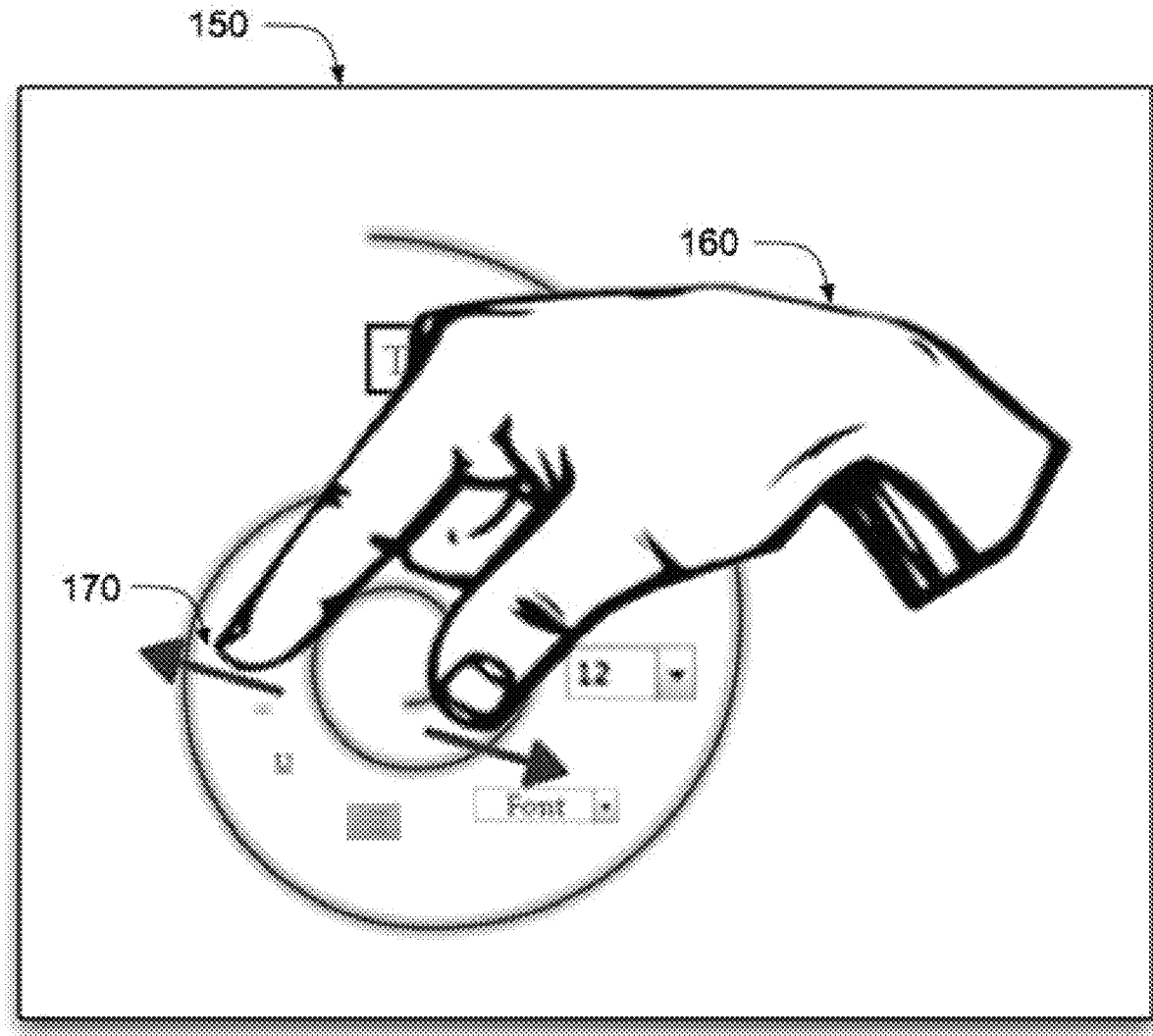
FIG. 4 illustrates another user gesture example used to traverse up a context menu hierarchy according to example embodiments.

In another embodiment, the previous context menus appear to the right of the current context menu. In another embodiment, the previous context menus appear above or below the current context menu. FIG. 4 illustrates another user gesture example used to traverse up a context menu hierarchy according to example embodiments. Referring to FIG. 4, a gesture to traverse up the context menu hierarchy is shown 150 depicting a context menu under a user's hand 170. The user has two pointing devices (i.e., two fingers) being placed on the display 160. These two pointing devices are moved apart in a reverse-pinching motion (outward) as a gesture to traverse up the hierarchy of context menus. The resulting behavior is the current context menu is removed and replaced by the context menu above the current context menu in the hierarchy. If there are no higher context menus available in the hierarchy, then the gesture command is ignored and no action occurs.

In another example, parallel functions may be used to manipulate the context menu. Parallel functions permit for two or more separate activities that are brought together or combined to perform a specific action. Parallel functions permit for functionality on a touchscreen on a smaller sized device. This functionality permits for a greater intuitive interaction due to the nature of the touchscreen, this functionality that may not be available on a screen with more real estate. This type of action is further depicted below by the simultaneous functions of two actions referred as action 'A' and action 'B'. These simultaneous functions are performed in parallel permitting the application to assign the functionality associated with action 'A' with the data associated with action 'B'.

The user is able to perform a gesture to display the context menu, and then traverse through the context menus and/or submenus to select a single menu item in action 'A'. In parallel, the user is able to perform action 'B'. This action can be in the form of utilizing another input as a separate pointing device or the user's gesture, voice, etc., that is utilized as input to the application. The application applies the functionality associated with the selected menu item to the data that is incoming to the application from action 'B'. Another example involves the user utilizing a pointing device, for example, a finger on a first hand or a user's voice to traverse through the context menu arriving at a single menu item. In parallel, another pointing device, for example, a finger on a second hand or a user's voice, locates text in a browser window and highlights a portion of the text in the browser window. The highlighted text is then copied to the device's internal memory.

On smartphone operating systems currently in the market today, there exists functionality that permits highlighted text in any application to be copied to the device's internal memory or memory external to the device. To perform this action, the user long-presses on a word, or group of words on the display. The operating system responds by performing a system-level function that will perform a corresponding activity. For instance, there are pointers placed at the beginning and end of the selected and/or highlighted text. These pointers permit the user to move the selected text and select exactly the words and/or phrases desired. A menu appears on the top or bottom of the display that permits the user to select one of the menu items and copy the highlighted area to the internal memory. The selected text with the second pointing device is then moved into the area with the context menu and released. Upon releasing the pointing device(s), functionality exists to permit the receiving data (i.e., highlighted text) to be inserted into the application.

The selected menu item from the first pointing device is applied to the incoming data from the second pointing device. For example, the first pointing device has selected the menu item related to a "bold" text. The second pointing device, may have highlighted text in another application, for example a browser window, and may drag the highlighted text over the context menu and release the text to drop the highlighted text over the context menu. When the data is received to the application, the incoming text will be altered to be a bold style. In another embodiment, the first pointing device is moved into the browser window permitting for the same functionality.

In another example, the user is able to choose multiple menu items that are stored and applied to incoming data to the application. In this embodiment, the user is permitted to navigate through the context menu via gestures, voice or other input means to arrive at a particular menu item. Once a first menu item is selected, a gesture, referred to as the "Multiple Item Gesture" is input by the user. When the multiple item gesture is received by the application, the application responds by storing the item internal to the application. The application functionally understands that this is a first menu item that will be assigned to incoming data of the application at a later time. Once one or more menu item(s) are stored, the application permits for traversing the context menu to choose one or more additional menu items.

The "Multiple Item Gesture" can be any functional gesture, input, command, prompt, etc., but most preferably it would be a gesture that can be performed by one or two pointing input devices, or capable of being performed by a single hand or a user voice. Having the ability to utilize a single hand, voice or a combination of thereof will aid the user in utilizing another input source for other functionalities. The "Multiple Item Gesture" may be, for example, the user swiping the identified menu item in the context menu down toward the bottom of the display prior to submitting another command by remaining input options.

In another example, the currently stored menu items are displayed visually on the device's touchscreen thus permitting the user to have a visual indication as to the currently stored menu items. These currently stored menu items can be displayed as small icons reflecting the icon of the stored menu item in any location on the device's touch screen. The user is then able to touch/select a stored menu item and that particular menu item will be removed from the stored list.

Once the stored menu items are selected, data that is input to the application via a dragging gesture, or another defined gesture which inputs data from an external source (i.e., another application, word processing document, webpage, etc.) to the application is modified according to the defined menu items. This functionality permits the user to select how incoming data is manipulated according to the multiple formatting options offered by the context menu. The application containing the context menu can reside on the user's device 12/14, on a device communicably coupled to the user's device 12/14 via the Internet 16, the network 16, the system server 18, and/or the database 20.

Figure 5:
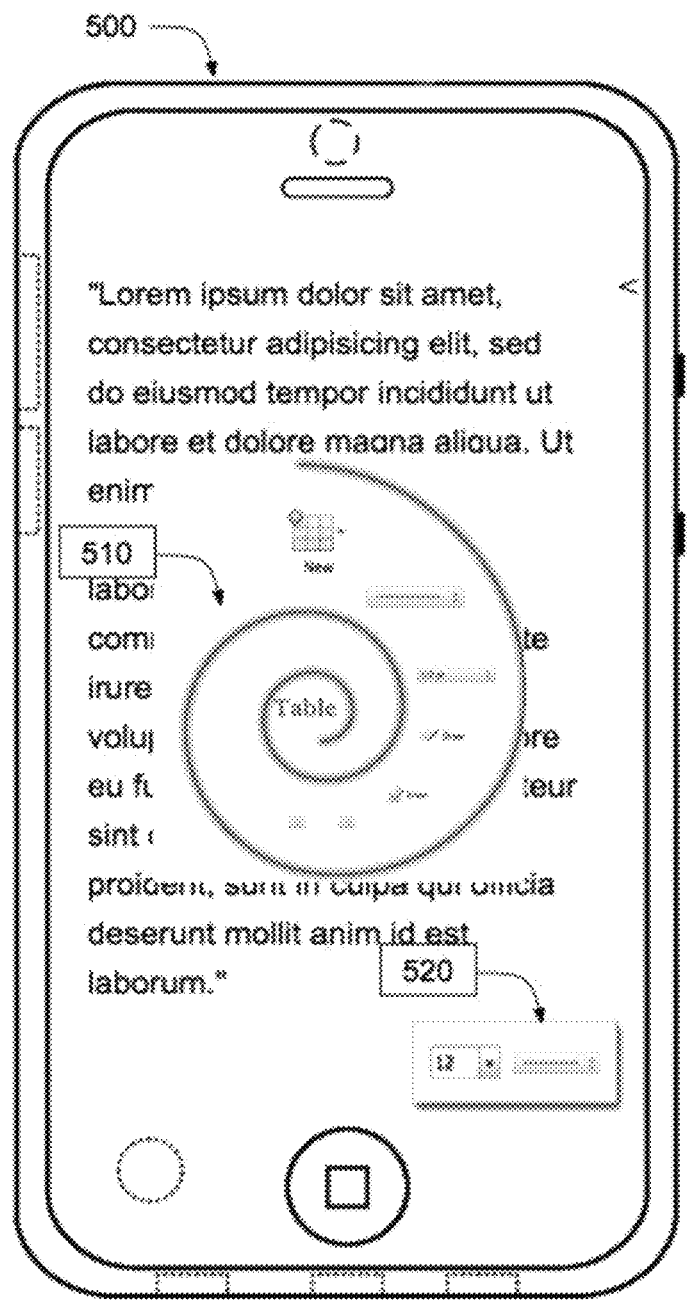
FIG. 5 illustrates multiple menu selections from a context menu according to example embodiments.

FIG. 5 illustrates multiple menu selections from a context menu according to example embodiments. Referring to FIG. 5, a possible implementation of the user selecting multiple menu selections 500, may include a user selecting a menu item from the context menu 510. A menu item can be "saved" by the user providing a predetermined gesture. For example, the user may drag the menu item down to the bottom of the screen. This gesture instructs the application to not perform the functionality associated with the menu item, but instead store the menu item for future use or reference. Upon storing the menu item, the context menu remains on the display so the user is able to continue selecting other menu items.

Once a menu item is stored, the user has the ability to continue to traverse through the context menu. If the user selects a menu item in the context menu at this point, the functionality associated with the menu item is executed and the previously stored menu item is ignored. This functionality permits the user to override the stored menu items. The user is able to continue to store multiple menu items from the context menu in the manner described above. There exists a list of stored menu items displayed on the screen, for example, on the lower portion of the screen 520. This display permits the user to keep track of which menu items have been stored previously and the list may increase or decrease in size according to a user's actions.

In another example, the stored menu item list is displayed in another portion of the screen. For example, the stored menu item list is displayed on the upper portion of the display or on the left or right of the display. The stored menu item list is implemented in a slide-out component. This component is not automatically displayed on the screen, but is accessible by a small arrow on the device, and when selected the stored menu item list slides into view on the display. There is another arrow when the stored menu items are in view that, when pressed, slides the stored menu item list out of view. The functionality of the menu items in the stored menu item list are performed when external data is accepted into the application as input. This functionality permits the user to predetermine how the data that is input to the application will appear on the display by permitting the user to dictate the appearance of the data by selecting multiple menu items from the context menu. The application containing the context menu can reside on the user's device 12/14, on a device communicably coupled to the user's device 12/14 via the Internet 16, the network 16, the system server 18, and/or the database 20.

In another embodiment, functionality exists that permits the application to be placed in a particular state henceforth referred to as the "Set State". When the application is placed in the "Set State", the application is halted and awaits a predefined action to continue functionality. In this example, the user traverses through the context menu utilizing one or more pointing devices and appropriate gestures to arrive at one or more menu items, then performs an action to bring the application into the "Set State". This action can be one of a predefined gesture that is associated with moving the application into the "Set State".

A voice command used to enter the "Set State" or otherwise utilized as input to the application. The voice command directs the application to enter into the "Set State". A key on the device's keyboard assigned to move the application to enter into the "Set State". A move of the eye iris predefined to move the application into the "Set State". Any other similar action to the above can be defined as the action that moves the application into the "Set State" without deviating from the scope of the current application.

Once the application is in the "Set State", the user is able to navigate away from the 1st application and switch to another application, referred to the $2^{nd}$ application, on the device. The $2^{nd}$ application can be displayed alongside the $1^{st}$ application or in a different window, for example on a tablet device. Once in the $2^{nd}$ application, the user is able to perform an action that captures data, for example, text by highlighting the text, or otherwise selecting the data from any activity normally associated with selecting data in an application. The data may be stored in the device's memory, memory external to the device, or memory accessed by the device, or may otherwise be highlighted and dragged into the application.

Once the data is stored in memory, the user then can reactivate the application previously put in the "Set State" by performing a functional gesture, such as a predefined gesture associated with moving the application out of the "Set State". A voice command wherein the voice is utilized as input to the application. The voice command directs the application to exit the "Set State". A key on the device's keyboard assigned to move the application to enter out of the "Set State". A move of the iris predefined to move the application out of the "Set State", or any other similar action to the above can be defined as the action that moves the application out of the "Set State" without deviating from the scope of the current application.

Once the application is reactivated, the data previously stored in the internal memory of the device, or external to the device, is copied into the application. For example, the user can select a button on the application entitled "Paste". Also, the application can automatically be removed from the "Set State" by simply reactivating the application. Any other similar action can be associated with moving the application out of the "Set State" without deviating from the scope of the current application.

Upon moving the application out of the "Set State", the application then places the incoming data into the application. Also, if any menu items were stored in the application then the functionality associated with these menu items are performed on the incoming data. The $1^{st}$ application can reside on the user's device 12/14, on a device communicably coupled to the user's device 12/14 via the Internet, the network 16, the system server 18, and/or the database 20. The $2^{nd}$ application can reside on the user's device 12/14, the network 16, the system server 18, and/or the database 20.

In another embodiment, functionality is incorporated into the application permitting for the selection of particular content from an application (i.e. webpages, other applications). When attempting to capture data from a document, particular options are defined that determine the selected text on a more granular level. Examples may include the document in its entirety, the document without images, the document without header and footer, the document without any advertisements, the document without descriptive information (i.e., the title, date, author(s), contact information, copyright information, etc.).

When selecting or copying a portion of an application (i.e., a webpage) to the device's memory or external to the device, the functionality of the application permits the user to only copy a portion of the webpage by dictating which element(s) are desired to be copied. Therefore, instead of relying on the user having to highlight the portion of text to copy to the device's memory, it is more intuitive and easier to determine the text from the webpage to copy and to apply the selection approach identified above. There are various ways that the user is able to specify which portion of the webpage that is desired. For example, one embodiment permits the user to speak a phrase that is used as input to the application. Utilizing this approach, the user would speak one of the following phrases and the application would associate it with the proper function, "Document in its entirety", "Document without images", "Document without header and footer", "Document without any advertisements", "Document without descriptive information", "Word or phrase X in the Document to Word or phrase Y in the Document", and "Word or phrase X in the Document to end of the Document."

In another embodiment, there is a menu that permits the user to select between one of the functions. This menu is interworked into the operating system and is displayed by a triggering mechanism from the user. This triggering mechanism can be a specific gesture that is assigned to this function, a specific key (or key-sequence) that the user enters on the device, a physical button on the device, a specific movement of the iris for devices that support analyzing of the iris movement a voice prompt spoken by the user and used as input to the application, and any other normal approach that an application may utilize to trigger a specific function.

Figure 6:
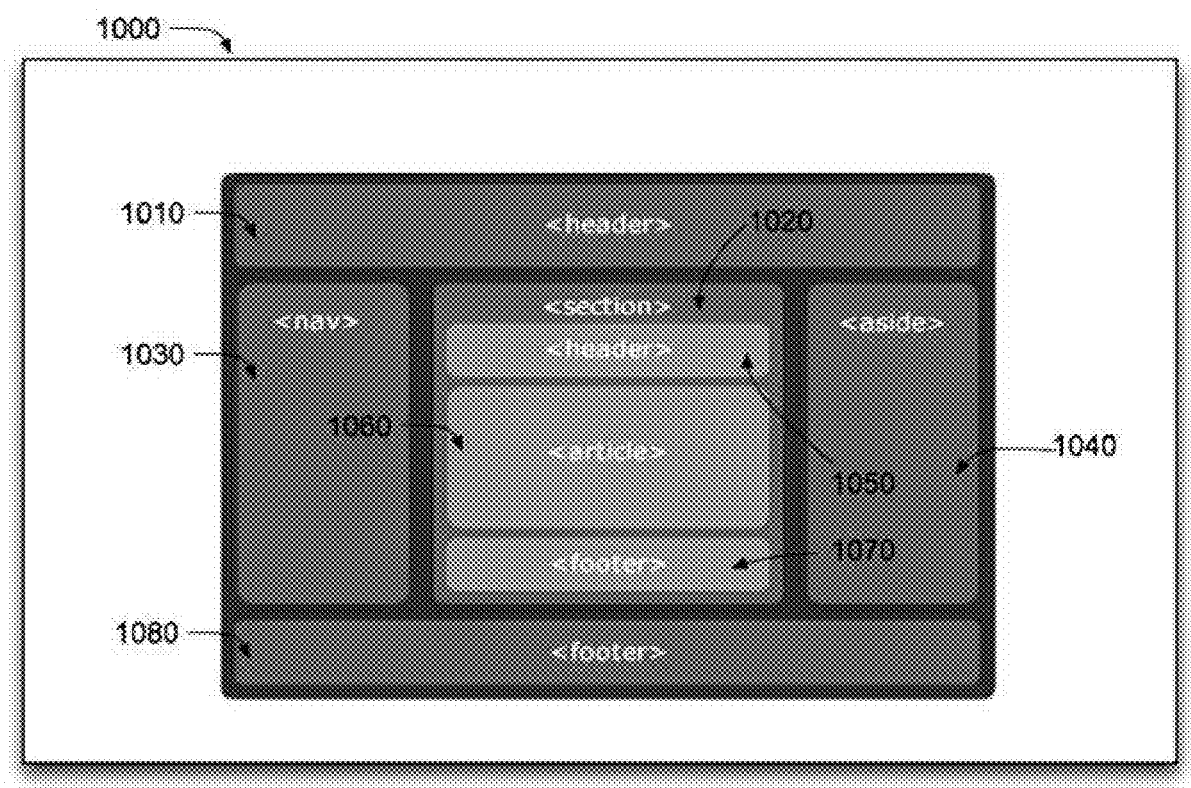
FIG. 6 illustrates an example HTML layout of a web page according to example embodiments.

FIG. 6 illustrates an example HTML layout of a web page according to example embodiments. Referring to FIG. 6, the layout 1000 displays some of the possible elements that makeup a typical webpage. There are various other elements that are possible on a webpage, as well as other elements that are internal to the elements shown. For example, in each of the included elements, there may be an '<img>' element included that contains an image. This depiction shows the basic elements for the purpose of describing this embodiment. Other elements may be utilized in the design of this embodiment without deviating from the scope of the current application.

Some webpages contain a <header> element 1010 and a <footer> element 1080. These elements exist on all pages associated with the website. The <nav> element 1030 contains the website's navigation and will also exist on all pages of the website. The <aside> 1040 element may contain other aspects of the website, for example advertisements or similar content. The <section> element 1020 is utilized as a wrapper element containing other elements permitting the structure of the website to be divided into a tabular appearance. In this example, the <section> element 1020 contains three elements: a <header> element 1050 that may contain the title of the article, the <article> element 1060 that contains the actual content of the article, and a <footer> element 1070 that may contain other aspects of the article. The section element may be repeated in the case where there are multiple articles to display on the page.

Figure 7:
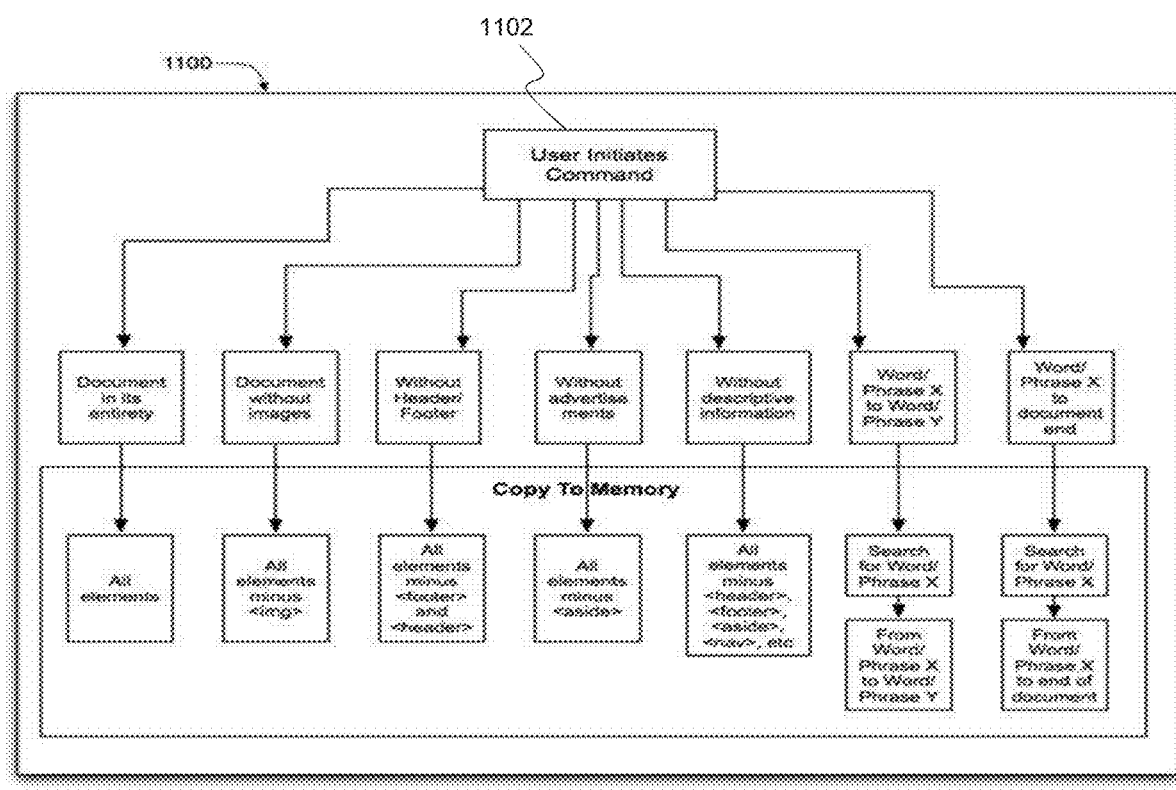
FIG. 7 illustrates an example data copying example according to example embodiments.

FIG. 7 illustrates an example data copying example according to example embodiments. In this embodiment, the data flow diagram 1100 illustrates how particular elements can be copied to the device's internal memory or memory external to the device. A user may copy data from an application by initiating a command 1102. For example, if the user selects "Document in its entirety", all elements of the webpage are copied to memory that is either internal or external, or accessible to the device. In this example, all of the webpage elements are copied, and the entire webpage is duplicated. If the user selects "Document without images", then all of the elements are copied to memory which is either internal or external, or accessible to the device minus any <img> element(s). The <img> element is the HTML 5 element containing an image file.

If the user selects "Document without header and footer", all of the elements in the webpage are copied to the memory that are either internal or external, or accessible to the device minus the <header> and <footer> element(s). If the user selects "Document without any advertisements", all of the elements in the webpage are copied to the memory that is either internal or external, or accessible to the device minus the <aside> element(s). If the user selects "Document without descriptive information", the <article> element is copied to the memory that is either internal or external, or accessible to the device. This includes the text in the <article> element minus any other elements including any <img> elements. If the user selects "Word or phrase X in the Document to Word or phrase Y in the Document", the application traverses through the <article> element(s) and seeks the word or phrase X in the document. This word or phrase X is copied to the memory that is either internal or external, or accessible to the device until the word or phrase Y is found.

If the user selects "Word or phrase X in the Document to end of the Document", the application traverses through the <article> element(s) and seeks the word or phrase X in the document. This word or phrase X is copied the memory that is either internal or external, or accessible to the device until the end of the document. In another example, a dual or parallel activity is defined in regards to how the external data is handled by the application with the context menu referred to as the $1^{st}$ application. The external application referred to as the $2^{nd}$ application is external to the $1^{st}$ application and data from the $2^{nd}$ application is input into the $1^{st}$ application by a specific action that instructs the device to insert the data into the $1^{st}$ application. This specific action can be one of a swipe gesture where the data from the $2^{nd}$ application is swiped toward the $1^{st}$ application, a voice command, such as a word or phrase X to word or phrase Y, or word or phrase X to 'end of document', as the voice is utilized as input to the device. The voice command directs the $1^{st}$ application to take the data from the $2^{nd}$ application as input.

Other options may include a key on the device's keyboard assigned to perform the action of inserting the data from the $2^{nd}$ application into the $1^{st}$ application. A move of the iris from the $2^{nd}$ application to the $1^{st}$ application for devices that support and track the movement of the iris. Any other similar action to the above can be defined as the action that moves the data from the $2^{nd}$ application to the $1^{st}$ application without deviating from the scope of the current application.

In one example, the user selects one or more menu items in the $1^{st}$ application's context menu, such as "Choosing Multiple Menu Items". In parallel, the user copies data (i.e., text) from the $2^{nd}$ application see section entitled. The user then performs a specific action to "move" the data into the $1^{st}$ application, using one of the predefined actions defined above permitting the data to be received as input to the $1^{st}$ application. The data is copied into the $1^{st}$ application with the selected menu item(s)' functionality assigned to the incoming data.

Figure 8:
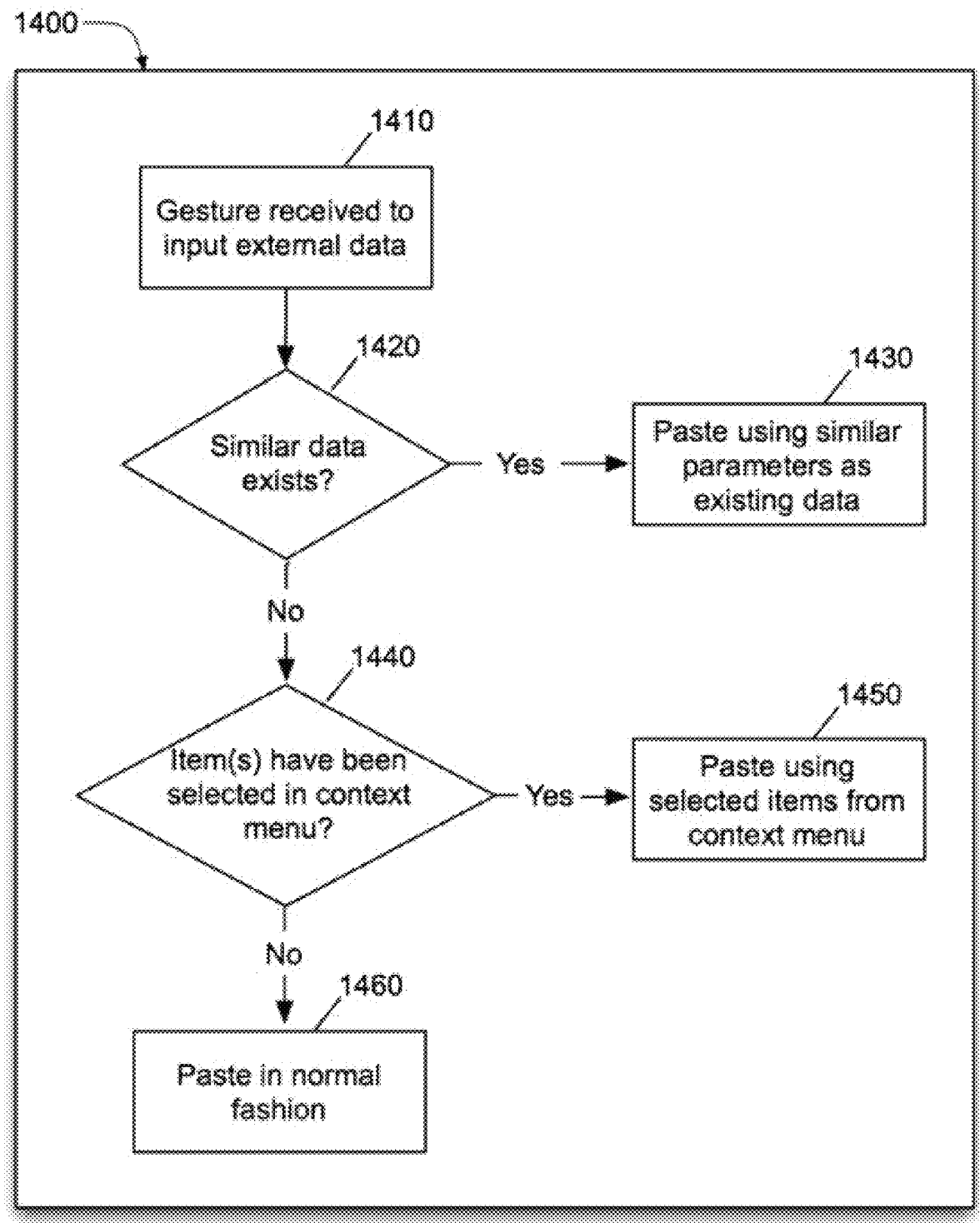
FIG. 8 illustrates the input of data to an application according to example embodiments.

FIG. 8 illustrates the input of data to an application according to example embodiments. Referring to FIG. 8, a flowchart of the functional aspect of data from a $2^{nd}$ application being brought into the $1^{st}$ application is illustrated 1400. The user performs the gesture to input the data from the $2^{nd}$ application to the $1^{st}$ application 1410. This can be performed as a swipe gesture where the data from the $2^{nd}$ application is swiped toward the $1^{st}$ application. A voice command, such as word or phrase X to word or phrase Y, or word or phrase X to end of document is utilized as input to the application. The voice command directs the $1^{st}$ application to take the data from the $2^{nd}$ application as input. A key on the device's keyboard may be assigned to perform the action of inserting the data from the $2^{nd}$ application into the $1^{st}$ application. Also, a move of the iris from the $2^{nd}$ Application to the $1^{st}$ application may be applied for devices that support and track the movement of the iris. Any other similar action to the above can be defined as the action that moves the data from the $2^{nd}$ application to the $1^{st}$ application without deviating from the scope of the current application.

The application may perform an initial check to determine if there are other elements currently existing in the application similar to the incoming data 1420. For example, if the incoming data is an image, then the application identifies other image elements in the current application. If the data is a table, then the application identifies other table elements currently existing in the application. If there are other similar elements found in the current application, then the application utilizes the parameters of the similarly discovered elements to paste the incoming data into the $1^{st}$ application 1430. This permits the incoming data to adhere to the look and/or feel of the document for the incoming data.

In the alternative, if there are not similar elements found in the $1^{st}$ application as compared to the incoming data from the $2^{nd}$ application, then the application determines if the user has previously selected any item(s) from the context menu prior to performing the gesture to input external data from the $2^{nd}$ application 1440. This scenario provides for the user to select one or more menu items from the context menu to use as the formatting for the incoming data to the application. If there are stored menu items, then the selected menu items are utilized for formatting of the incoming data 1450. For example, if the user had pre-selected the font size as "12", and the font style as "bold", then these attributes are applied to the incoming data to the application. As another example, if a particular table format was selected by the user as a menu item in the context menu, and if the incoming data is a table, then the previously selected table format will be applied to the incoming data. If there are no prior menu items selected in the context menu, then the data is pasted into the document without any applied formatting 1460. The $1^{st}$ application can reside on the user's device 12/14, on a device communicably coupled to the user's device 12/14 via the Internet, the network 16, the system server 18, and/or the database 20. The $2^{nd}$ application can reside on the user's device 12/14, the network 16, the system 18, and/or the database 20.

Figure 9:
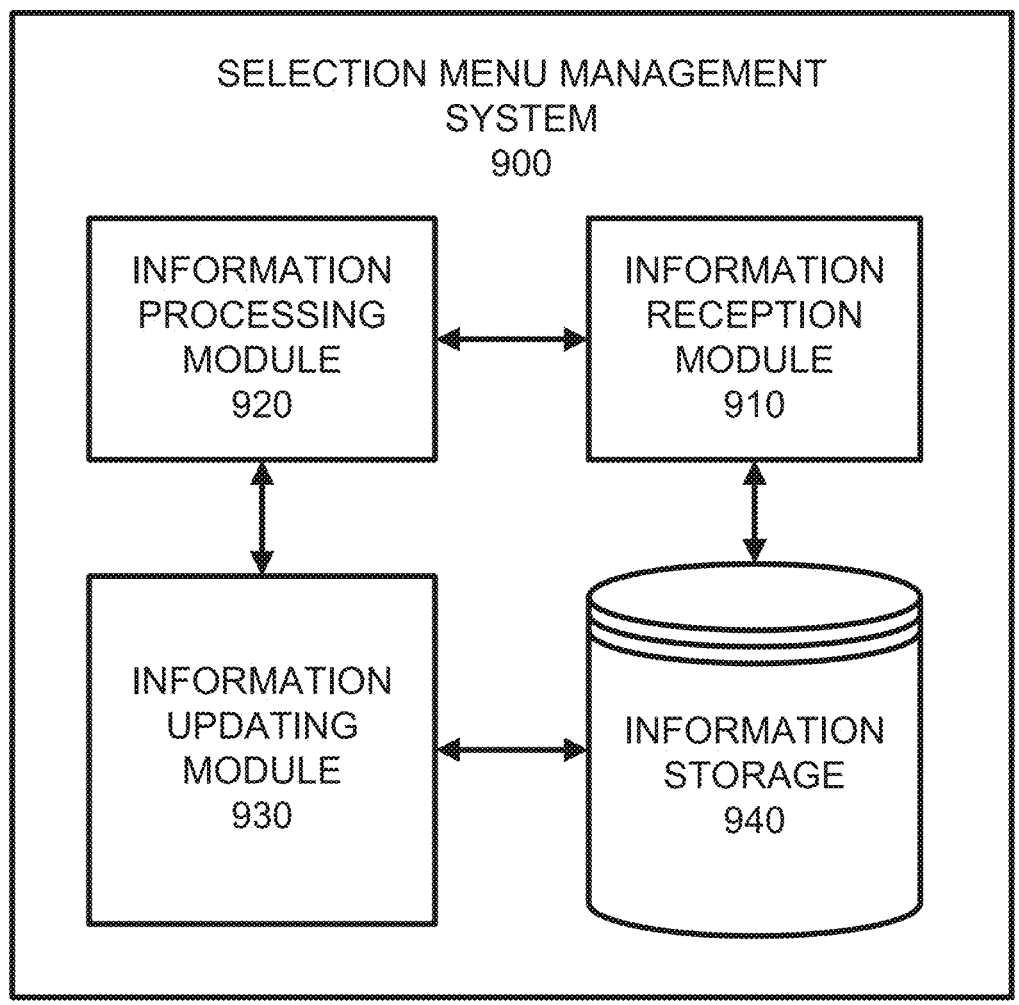
FIG. 9 illustrates an example system configuration according to an example embodiment of the present application.

FIG. 9 illustrates an example system device or devices configured to perform one or more example embodiments of the present application. Referring to the system of FIG. 9, the selection menu management system 900 includes various modules which may be part of the same device or multiple devices communicating across a network. In one example method of operation, the information reception module 910 receives at least one input command on a first menu displayed on a touch receptive surface of a user device, the information processing module 920 then modifies a current view of the first menu by moving at least one menu item wither upward or downward among a plurality of different menu options and selects the menu item responsive to the received input command. Next, an additional input command is received to select a functionality to apply to the selected menu item, and the update module 930 applies the functionality to the selected menu item and a record of those operations are stored in the information storage memory 940.

Additional operations may include displaying one or more contextual menu options at a second menu separate from the first menu responsive to the input command being received. Then, a third input command may be received for selecting an additional menu option included on the first menu displayed, and the additional menu option may be applied to the second menu. The input command and the additional input command may be also received simultaneously and at different positions of the touch receptive surface of the user device. The input command and the additional input command can be any two of a finger touch input command, voice commands, gesture commands, eye iris movement commands, etc. The functionality assigned to the input command can be identified and the functionality of the input command can be assigned to data selected by the additional input command. This may cause a modification to the data associated with the additional input command which is based on the functionality assigned to the data. The functionality may include any of selecting a portion of data, copying a portion of data, cutting a portion of data, and highlighting a portion of data.

In another example embodiment, a method may include receiving an input command on a first menu displayed on a touch receptive surface of a user device, selecting a menu item responsive to the received at least one input command and receiving an additional input command that is different from the first input command type. The processing module 920 may than identify the additional input command as a multiple item gesture command, and store the multiple item gesture command in memory 940. The input command may be identified to be a touch input command and the additional input command could be a touch input command, a voice input command and a gesture input command or other commands described throughout this application. Next, a third input command may be received and a list of previously stored menu items can be displayed responsive to the third input command, and a menu selection may then be received from the previously stored menu items stored in memory 940. Continuing with the same example, a set state status for the application may be initiated responsive to the third input command being received. A new application may then be initiated which is different from the first application and data selected from the new application may be received and stored in the memory so the set state status for the application can be deactivated, and the data can then be copied into the application. A menu item stored in memory can then be applied to the copied data. A copy command is then received and a search term can be applied to the copy command to limit an amount of words copied, and the copy operation may be performed to the data based on the applied copy command.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 10 illustrates an example network element 1200, which may represent any of the above-described network components, etc.

Figure 10:
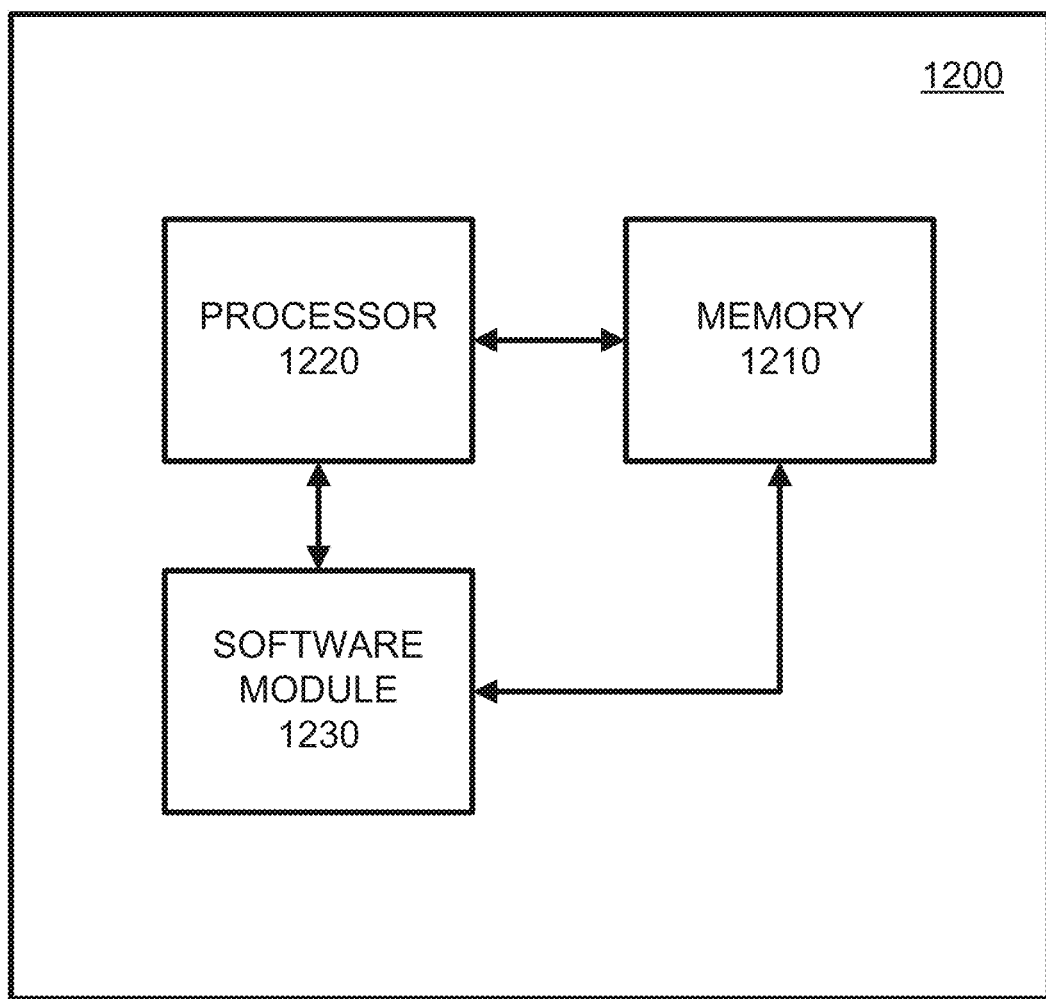
FIG. 10 illustrates an example network entity device configured to store instructions, software, and corresponding hardware for executing the same, according to example embodiments of the present application.

As illustrated in FIG. 10, a memory 1210 and a processor 1220 may be discrete components of the network entity 1200 that are used to execute an application or set of operations. The application may be coded in software in a computer language understood by the processor 1220, and stored in a computer readable medium, such as, the memory 1210. The computer readable medium may be a non-transitory computer readable medium that includes tangible hardware components in addition to software stored in memory. Furthermore, a software module 1230 may be another discrete entity that is part of the network entity 1200, and which contains software instructions that may be executed by the processor 1220. In addition to the above noted components of the network entity 1200, the network entity 1200 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 9 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving, by a destination application of a user device, a first input command that selects at least one menu item from a menu of the destination application that is displayed on the user device, the at least one menu item representing a text styling format;
suspending the destination application is response to a first input to the user device;
while the destination application is suspended, receiving, by a source application of the user device, a second input command that selects textual data from a source window of the source application that is displayed on the user device while the at least one selected menu item selected via the menu of the destination application is held by the destination application, the selected textual data comprising an initial text styling format that is different than the selected text styling format selected by the first input command; and
in response to a second input to the user device reactivating the destination application, transferring a copy of the selected textual data from the source window of the source application into the destination application while simultaneously applying the selected text styling format represented by the at least one selected menu item held by the destination application to the selected textual data from the source application, thereby changing the initial text styling format of the selected textual data to the selected text styling format represented by the at least one menu item selected by the first input command.

2. The method of claim 1, further comprising:
displaying at least one contextual menu option at a second menu separate from the first menu responsive to the first input command received.

3. The method of claim 2, further comprising:
receiving at least one third input command selecting an additional menu option included on the second menu; and
adding a styling format represented by the additional menu option to the selected text styling format.

4. The method of claim 1, wherein the first input command and the second input command are received simultaneously and at different positions of a touch receptive surface of the user device.

5. The method of claim 1, wherein the first input command and the second input command each comprise at least one of:
finger touch input commands, voice commands, gesture commands and eye iris movement commands.

6. The method of claim 1, wherein the textual data selected by the second input command comprises:
a string of textual data having an initial font, and
wherein the transferring comprises:
changing initial font of the string of textual data to a different font selected by the second input command.

7. The method of claim 1, wherein the transferring the copy of the selected data and the simultaneously applying the selected text styling format stored internal within the first application to the selected textual data are automatically performed when a user releases the second input command.

8. The method of claim 1, further comprising:
in response to receiving the first input command, holding a selection of the at least one selected menu item representing the selected text styling format internal within the destination application, and
wherein the simultaneously applying further comprises:
releasing the holding of the at least one selected menu item held internally by the destination application.

9. An apparatus comprising:
a memory storing instructions; and
a processor that when executing the instructions is configured to:
receive, by a destination application of apparatus, a first input command that selects at least one menu item from a menu of the destination application displayed on the apparatus, the at least one menu item representing a text styling format,
suspend the destination application is response to a first input to the user device,
while the destination application is suspended, receive, by a source application of the a user device, a second input command that selects textual data from a source window of the source application that is displayed on the apparatus while the at least one selected menu item selected via the menu of the destination application is held by the destination application, the selected textual data comprising an initial text styling format that is different than the selected text styling format selected by the first input command, and
in response to a second input to the user device reactivating the destination application, the processor is further configured to:
transfer a copy of the selected textual data from the source window of the source application into the destination application, and
simultaneously apply the selected text styling format represented by the at least one menu item being held by the destination application to the selected textual data from the source application to change the initial text styling format of the selected textual data to the selected text styling format represented by the at least one menu item selected by the first input command.

10. The apparatus of claim 9, wherein the processor is further configured to:
display at least one contextual menu option at a second menu separate from the first menu responsive to the first input command received.

11. The apparatus of claim 10, wherein the receiver is further configured to:
receive at least one third input command selecting an additional menu option included on the second menu; and
add a styling format represented by the additional menu option to the selected text styling format.

12. The apparatus of claim 9, wherein the first input command and the second input command are received simultaneously and at different positions of a touch receptive surface of the apparatus.

13. The apparatus of claim 9, wherein the first input command and the second input command each comprise at least one of:
finger touch input commands, voice commands, gesture commands and eye iris movement commands.

14. The apparatus of claim 9, wherein the textual data selected by the second input command comprises:
a string of textual data having an initial font, and
wherein the transferring comprises:

changing initial font of the string of textual data to a different font selected by the second input command.

15. The apparatus of claim 9, wherein the transfer of the copy of the selected data and the simultaneous application of the selected text styling format stored internal within the first application to the selected textual data is automatically performed when a user releases the second input command.

16. The apparatus of claim 9, wherein, in response to the receipt of the first input command, the processor is further configured to:
hold a selection of the at least one selected menu item representing the selected text styling format internal within the menu of the destination application, and
wherein, when the processor is configured to simultaneously apply the selected text styling format, the processor is further configured to:
release the hold of the at least one selected menu item held internally by the destination application.

17. A non-transitory computer readable storage medium configured to store instructions that cause a processor of a user device to perform:
receiving, by a destination application of the user device, a first input command that selects at least one menu item from a menu of the destination application that is displayed on the user device, the at least one menu item representing a text styling format;
suspending the destination application is response to a first input to the user device;
while the destination application is suspended, receiving, by a source application of a user device, a second input command that selects textual data from a source window of the source application that is displayed on the user device while the at least one selected menu item selected via the menu of the destination application is held by the destination application, the selected textual data comprising an initial text styling format that is different than the selected text styling format selected by the first input command; and
in response to a second input to the user device reactivating the destination application, transferring a copy of the selected textual data from the source window of the source application into the destination application while simultaneously applying the selected text styling format represented by the at least one selected menu item held by the destination application to the selected textual data from the source application, thereby changing the initial text styling format of the selected textual data to the selected text styling format represented by the at least one menu item selected by the first input command.

18. The non-transitory computer readable storage medium of claim 17, wherein the instructions further cause the processor to perform:
displaying at least one contextual menu option at a second menu separate from the first menu responsive to the first input command received.

19. The non-transitory computer readable storage medium of claim 18, wherein instructions further cause the processor to perform:
receiving at least one third input command selecting an additional menu option included on the second menu; and
adding a styling format represented by the additional menu option to the selected text styling format.

20. The non-transitory computer readable storage medium of claim 17, wherein the first input command and the second input command are received simultaneously and at different positions of a touch receptive surface of the user device.

* * * * *